United States Patent [19]

Hammarstedt

[11] Patent Number: 4,715,579
[45] Date of Patent: Dec. 29, 1987

[54] RADIATOR VALVE INCORPORATING PRESETTING MEANS

[75] Inventor: Curt Hammarstedt, Alstermo, Sweden

[73] Assignee: Tour & Andersson AB, Johanneshov, Sweden

[21] Appl. No.: 14,667

[22] Filed: Feb. 13, 1987

[30] Foreign Application Priority Data

Feb. 17, 1986 [SE] Sweden ................................. 8600679

[51] Int. Cl.⁴ ............................................ F16K 47/08
[52] U.S. Cl. ................................ 251/121; 137/614.18; 137/553
[58] Field of Search .............................. 251/121, 120; 137/614.18

[56] References Cited

U.S. PATENT DOCUMENTS 1,558,330 10/1925 Bain .............................. 251/121 X

FOREIGN PATENT DOCUMENTS 530619 7/1955 Italy .................................... 251/121

Primary Examiner—Arnold Rosenthal
Attorney, Agent, or Firm—Hayes, Davis & Soloway

[57] ABSTRACT

A radiator valve having an enclosed pre-adjustment arrangement. In the valve body (10) a plastic insert (36) is disposed, having a coaxial, conical inner surface (38) and a projection (40) provided with a flow opening (34). The flow opening is made with a desired accuracy of size and surface smoothness. The pre-adjustment spindle (12) has a conical member (44), including a shield member (52), the height of which increases continuously. The shield member (52) is adjusted in order to cover up a larger or a smaller portion of the flow opening (34) and is locked by means of a tightening nut (62).

10 Claims, 3 Drawing Figures

RADIATOR VALVE INCORPORATING PRESETTING MEANS

The present invention relates to a radiator valve having an internal pre-adjustment arrangement.

Known radiator valves having an internal pre-adjustment arrangement include a cylindrical pre-adjustment spindle, which shields, to a greater or smaller degree, a flow opening, which has a radial alignment in relation to the pre-adjustment spindle. However, such known radiator valves display large variations in flow rate at the same pre-adjustment level for different valves of the same type. This is particularly true for small flow rates, for which deviations of between 50 and 100 percent from the rated value have been observed. Such deviations may result in significant expense, partly in the form of unnecessarily large costs of heating and partly in the form of additional expenses for readjustment of the pre-adjustment.

An important cause of these variations in flow rate is that the flow opening may have different shapes and different degrees of wall unevenness. Radiator valves are cast and develop casting flash and other types of unevenness during casting. Due to the position of the flow opening the same is not accessible for subsequent machining without heavy costs. A second cause for the inadequate exactness is the requirement that a clearance be provided between the cylindrical spindle and the valve body in order to be able to operate the spindle. This may result in leakage to some extent through this clearance. Water is not supposed to pass through but the restriction gap below the spindle, however, particularly when large pressure drops and small flows prevail, a large percent leakage through said clearance takes place.

A previously known valve (SE-A-221 020) has large individual variations as to flow capacity due to different degrees of wall unevenness as well as due to variations as to clearance between the cylindrical spindle and the valve body, which clearance particularly for small flows results in a large percent leakage past the spindle.

The known pre-adjustment spindle is fixedly attached in an axial direction in the valve body and seals against the same by means of an O-ring. A change as to the pre-adjustment is accomplished by turning the pre-adjustment spindle by means of a wrench, provided there is a sufficient clearance between the pre-adjustment spindle and the valve body.

In such a known valve the clearance and the leakage between the pre-adjustment spindle and the valve body are not changed, in case the pre-adjustment spindle is displaced in an axial direction. This clearance and leakage is eliminated by providing the valve with a conical insert in accordance with the present invention, which seat receives a conical member of the pre-adjustment spindle. In this way one of the causes of the variations in flow capacity at the same pre-adjustment of different valves of the same make is eliminated. The cited references do not mention any conical members of this sort or the technical effect which may be attained by means of the same.

Another previously known valve (SE-A-359 632) has a regulating body, which includes a valve cone as well as a shield member with a varying height in the circumferential direction. The shielded member may be introduced into an annular groove, which surrounds the valve seat. The regulating body is not pivotally and axially displaceable in a hexagonal recess in the upper portion of the body. A change as to the pre-adjustment is accomplished by turning the upper portion of the body and with it the regulating body in relation to the valve body.

This valve also has a clearance between the shield member of the regulating body and the valve body and thus, there is a leakage. The leakage and the variations in the same are probably quite significant, since the regulating body is displaceable in an axial direction.

An additional advantage of the conical insert of the present invention resides in the fact that it is somewhat elastic and can be produced, with great precision, of a plastic material, which does not seize up against the spindle. By combining a conical pre-adjustment spindle and a conical seat, both made of a metal, there is a risk of the spindle seizing, particularly when the spindle has been tightened firmly. Thus, by means of the plastic insert a reproducible opening size from one valve to another and a more reliable function of the pre-adjustment spindle is attained.

By using a conical insert 36 of an elastic material it is also possible to use a metallic seal between the valve body and the pre-adjustment spindle. The condition for using a metallic seal in combination with conical seat surfaces is that the insert be somewhat elastic and be able to take up production tolerances due to elastic deformation. Known pre-adjustment spindles, e.g. according to SE-A-221 020, use an O-ring seal. O-rings have a short lifetime in heating installations and must be replaceable while in operation, however, the O-ring of SE-A-221 020 is not.

By combining a conical pre-adjustment spindle having a conical seat and a plastic insert including this seat and the flow opening of the valve, very small variations in flow rate between valves and a more reliable construction having a metallic seal between the pre-adjustment spindle and the valve body are attained.

Thus, the object of the present invention is to provide a radiator valve of the above-described kind, which offers an accurate and predictable pre-adjustment from one valve to another valve of the same design and which is inexpensive to produce, is safe to operate and inexpensive as to maintain and service. This object is achieved by providing a radiator valve incorporating presetting means for the quantity of a fluid flowing through said valve, comprising a valve body 10 with a presetting spindle 12 having a shield member 52, the height of the shield member varies circumferentially whereby the shield member can be adjusted to close a larger or smaller part of a flow opening 34 of said valve to achieve a desired preset, and incorporating a valve cone 14 being moveable via a spindle 16 and a piston 18 to control the distance of the valve cone to an adjacent valve seat 30, wherein said valve has a conical seat 38 for receiving a cooperating conical portion 44 of said presetting spindle 12, said conical portion incorporating said shield member 52 and said conical seat incorporating said flow opening 34.

By means of a radiator valve according to the present invention, it is possible to achieve a precalculated pre-adjustment, which results in energy savings and eliminates otherwise needed readjustments.

As distinguished from the known valve, the pre-adjustment spindle according to the present invention abuts which a conical member 44 against a conical seat 38 without any clearance and without any leakage past the spindle whatsoever. When the pre-adjustment is to be changed, a clamping nut is undone, and it is then possible to displace the pre-adjustment spindle in an axial direction. During this displacement in any axial direction, which may take splace spontaneously due to the elastic properties of the conical seat or which happens directly, when the pre-adjustment spindle is turned, a certain amount of clearance between the conical seat and the conical member of the pre-adjustment spindle arises. In this way the required clearance for turning the pre-adjustment spindle is present only when the pre-adjustment is changed, while for the rest there is a leakage free contact between the pre-adjustment spindle and its conical seat surface.

The invention also relates to an insert with a conical inner surface, which is to abut against the concial member of the pre-adjustment spindle, the flow opening (234) of the valve being disposed in this insert towards the outlet. By means of such an insert, having a flow opening, the second cause of variations in flow capacity in known valves due to wall unevenness produced during the casting of the valve body is eliminated. It is difficult and expensive to remove such wall unevenness in known valves, since the flow opening often is asymmetrically disposed in the valve body. By means of such an insert this cause of variations in flow capacity is eliminated in a simple and reliable manner and at low cost.

The present invention will be explained, by way of example, in the following description of a preferred embodiment, reference being made to the accompanying drawings, in which.

Figure 1:
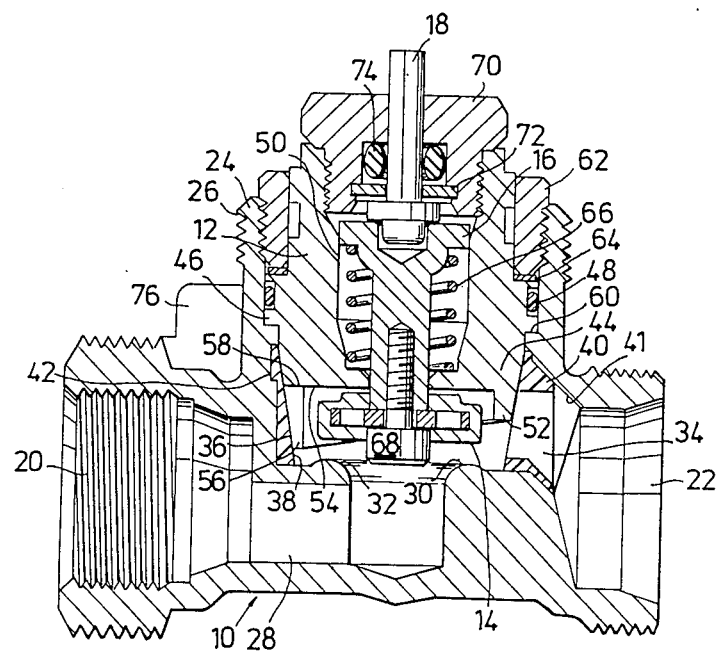
FIG. 1 is a cut view of a radiator valve according to the present invention.

The radiator valve shown in FIG. 1 includes a valve body 10 having a pre-adjustment spindle 12 and a valve cone 14, which via a spindle 16 and a piston 18 is acuated by an adjustment device, not shown. The valve body has an inlet 20, an outlet 22, as well as a side aligned pipe socket 24 for the pre-adjustment spindle and the valve cone. The pipe socket has a thread connection 26 for an arbitrary adjustment device, e.g. a thermostat or a hand knob. Flow channel 28 of the valve is provided with a valve seat 30, opposite to cone 14 and provided with a surface 32, which is curved in an axial direction. Furthermore, flow channel 28 includes a flow opening 34, shielded by pre-adjustment spindle 12.

In that portion of pipe socket 24, which is adjacent valve seat 30, an insert 36 of a plastic material is arranged, which has a coaxial conical inner surface 38 and a projection 40, which bulges in a radial direction into the flow channel of the valve and forms the above-mentioned flow opening 34. The insert is retained in a groove in the inner wall of the pipe socket, which groove may be extended along the entire axial length of the insert.

Pre-adjustment spindle 12 has a conical portion 44, a radial flange 46 having a boring for an O-ring 48 as well as a central through hole 50. Conical portion 44 has a shield member or "veil" 52, which surrounds a space, encompassing a cone 14, and has a bottom portion 54. "Veil" 52 is designed to shield a large or a small portion of flow opening 34 in order to attain the pre-adjustment. The height of the "veil" decreases from a highest point at 56 continuously to a lowest portion 58 in flush with said bottom portion. In this manner it is possible, by means of turning the spindle, to effect a stepless adjustment of the free flow opening. As an alternative, the "veil" may be stair-shaped and this provides some distinct adjustment positions. In the intermediate positions a stepless adjustment also takes place.

Conical portion 44 has the same conicity as the inner surface 38 of the insert 36 and makes a sealing contact with the same. In this manner all the clearance between the pre-adjustment spindle and the insert is eliminated and consequently no leakage flows will appear any longer.

Radial flange 46 abuts downwardly against a collar 60. The pre-adjustment spindle is retained in a selected position by means of an externally threaded tightening nut 62, which via a support plate 64 forces flange 46 against collar 60. In this manner a leakage free, metallic sealing between the flange and the collar is obtained. Also a sealing between conical member 44 and insert 36 is obtained.

Central hole 50 of the pre-adjustment spindle receives spindle 16, which is surrounded by a return spring 66. In the lower portion of the spindle valve cone 14 is attached by means of a screw 68. In an upper end position the valve cone may seal against bottom portion 54. In the upper portion of the central hole a screw bushing 70 is arranged, which surrounds piston 18 as well as a support place 72 and a sealing O-ring 74. This O-ring may be changed during operation without a letting out of the system, since the valve cone seals against bottom portion 54 during the change operation.

Figure 2:
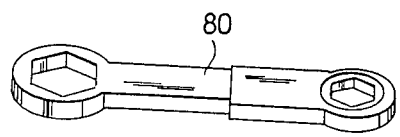
FIG. 2 is a tool used to accomplish said pre-adjustment.
Figure 3:
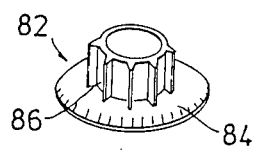
FIG. 3 is a removable adjustment knob used to accomplish said pre-adjustment.

In order to alter the pre-adjustment of the valve a non-adjustable wrench 80, shown in FIG. 2, is used, which has a small axial extension, and an adjustment knob 82, shown in FIG. 3, which has an adjustment scale 84 and a handle 86. By means of wrench 80 tightening nut 62 is undone between about a quarter of a revolution to half a revolution. Then the adjustment knob is placed on top of pre-adjustment spindle 12 and screw bushing 70, the scale of the knob being fixed in relation to a marking, not shown, on the pre-adjustment spindle. By means of handle 86 the pre-adjustment spindle is now turned to the desired position, which is read on scale 84 against index 76 of the valve body. By means of wrench 80 tightening nut 62 is tightened, while the adjustment knob is retained as a precautionary measure against a possible cooperative wrenching.

By using plastic insert 36 it is possible, at a low cost, to obtain a flow opening 34, which does not display uneven surfaces or casting flash or the like. In this way all openings of all valves will have the same shape and appearance. Also, we have found, that the individual deviation of different valves at different adjustment valves throughout is limited to an interval of plus or minus 10% inside the entire operating range of the pre-adjustment device.

It is possible to replace insert 34 with a pipe socket having a conical surface 38, which cooperates with a pre-adjustment spindle of the above-described type. The spindle then seals against the conical surface. In this way the gap leakage adjacent the spindle is eliminated, while the problem with an irregularly shaped flow opening 34 remains.

What is claimed is:

1. A radiator valve incorporating presetting means for the quantity of a fluid flowing through said valve, comprising a valve body (10) with a presetting spindle (12) having a shield member (52), the height of the shield member varies circumferentially whereby the shield member can be adjusted to close a larger or smaller part of a flow opening (34) of said valve to achieve a desired preset, and incorporating a valve cone (14) being moveable via a spindle (16) and a piston (18) to control the distance of the valve cone to an adjacent valve seat (30), wherein said valve has a conical seat (38) for receiving a cooperating conical portion (44) of said presetting spindle (12), said conical portion incorporating said shield member (52) and said conical seat incorporating said flow opening (34).

2. A radiator valve according to claim 1, comprising an insert (36) having a conical inner surface (38), which abuts against said conical member (44) and said shield member (52) of said presetting spindle, said flow opening (34) being provided in said insert.

3. A radiator valve according to claim 2, wherein said insert (36) is made of a resilient plastic material.

4. A radiator valve according to claim 2, wherein said insert is retained in an annular groove (42) and said insert is provided with a projection (40), which includes said flow opening (34), said projection bulging into an opening (41) in said valve body (10), which opening is oversized in relation to the flow.

5. A radiator valve according to claim 1, comprising a shield member (52) having an increasing height, from a lowest level (58), which renders flow opening (34) entirely free, to a highest level (56) bringing about maximum throttling of said opening.

6. A radiator valve according to claim 5, wherein the increasing height of the shield member (52) is continuous.

7. A radiator valve according to claim 1, wherein the shield member (52) surrounds a space, which receives the valve cone (14), and in that the spindle (16) and the piston (18) of the valve cone are disposed inside a coaxial central through hole (50) in said presetting spindle.

8. A radiator valve according to claim 1, wherein said presetting spindle (12) is fixedly disposed in an axial direction by means of a radial flange (46), which abuts a shoulder 60 to provide a metallic seal.

9. A radiator valve according to claim 1, wherein said presetting spindle is lockable in a preset position by means of a locking nut (62) having an exterior thread, said nut abutting against a shoulder of said presetting spindle.

10. A radiator valve according to claim 1, comprising a setting device for use in relation to said presetting spindle (12), incorporating an adjustment scale (84), cooperating with an index (76) on said valve body (10) and a handle (86).

* * * * *